US012591227B2

(12) United States Patent
Palme et al.

(10) Patent No.: US 12,591,227 B2
(45) Date of Patent: Mar. 31, 2026

(54) SYSTEMS AND METHODS FOR ANOMALY RECOGNITION AND DETECTION USING LIFELONG DEEP NEURAL NETWORKS

(71) Applicant: Neurala, Inc., Boston, MA (US)

(72) Inventors: Carl Palme, Charlestown, MA (US); Carly Franca, Boston, MA (US); Graham Voysey, Brighton, MA (US); Massimiliano Versace, Milton, MA (US); Santiago Olivera, Brookline, MA (US); Vesa Tormanen, Roslindale, MA (US); Alireza Majidi, Medford, MA (US); Yiannis Papadopoulos, Waltham, MA (US)

(73) Assignee: Neurala, Inc., Boston, MA (US)

( * ) Notice: Subject to any disclaimer, the term of this patent is extended or adjusted under 35 U.S.C. 154(b) by 832 days.

(21) Appl. No.: 17/811,779

(22) Filed: Jul. 11, 2022

(65) Prior Publication Data

US 2023/0011901 A1 Jan. 12, 2023

Related U.S. Application Data

(63) Continuation of application No. PCT/US2021/013056, filed on Jan. 12, 2021.
(Continued)

(51) Int. Cl.
*G05B 19/41* (2006.01)
*G05B 19/418* (2006.01)

(52) U.S. Cl.
CPC .................. *G05B 19/41875* (2013.01); *G05B 2219/32368* (2013.01)

(58) Field of Classification Search
CPC .... G05B 19/41875; G05B 2219/32368; G05B 23/024; G06N 3/045; G06N 3/0464; G06N 3/084; G06N 3/096
See application file for complete search history.

(56) References Cited

U.S. PATENT DOCUMENTS 10,481,579 B1 * 11/2019 Putman .............. G05B 19/4183
2011/0026804 A1 2/2011 Jahanbin et al.
(Continued)

FOREIGN PATENT DOCUMENTS

WO 2018208939 A1 11/2018

OTHER PUBLICATIONS

Japanese Notice of Refusal with Google Translation in Japanese App. No. 2022-542288 dated Sep. 6, 2024, 9 pages.
(Continued)

*Primary Examiner* — Christopher W Carter
(74) *Attorney, Agent, or Firm* — Smith Baluch LLP

(57) ABSTRACT

Industrial quality control is challenging for artificial neural networks (ANNs) and deep neural networks (DNNs) because of the nature of the processed data: there is an abundance of consistent data representing good products, but little data representing bad products. In quality control, the task is changed from conventional DNN task of "recognize what I learned best" to "recognize what I have never seen before." Lifelong DNN (L-DNN) technology is a hybrid semi-supervised neural architecture that combines the ability of DNNs to be trained, with high precision, on known classes, while being sensitive to any number of unknown classes or class variations. When used for industrial inspection, L-DNN exploits its ability to learn with little and highly unbalanced data. L-DNN's real-time learning capability takes advantage of rare cases of poor-quality products that L-DNN encounters after deployment. L-DNN can be applied to industrial inspections and manufacturing quality control.

32 Claims, 10 Drawing Sheets

Related U.S. Application Data

(60) Provisional application No. 62/960,132, filed on Jan. 12, 2020.

(56) References Cited

U.S. PATENT DOCUMENTS

| | | | | |
|---|---|---|---|---|
| 2016/0140419 | A1* | 5/2016 | Sumitomo | G06V 10/7515 |
| | | | | 382/216 |
| 2018/0330238 | A1 | 11/2018 | Luciw et al. | |
| 2019/0302707 | A1 | 10/2019 | Guo et al. | |
| 2020/0019790 | A1* | 1/2020 | Periaswamy | G06V 20/52 |
| 2021/0216865 | A1 | 7/2021 | Versace et al. | |
| 2022/0066435 | A1* | 3/2022 | Thimmanaik | G06T 7/0006 |

OTHER PUBLICATIONS

Covelle, "Quality Inspections with Multi-ROI," Neurala Blog, Nov. 11, 2020, 4 pages. Accessed at https://www.neurala.com/blog/quality-inspections-with-multi-roi. 4 pages.

International Search Report and Written Opinion in International Patent Application No. PCT/US2021/013056 mailed Apr. 1, 2021, 8 pages.

Murray, "Neurala Introduces Anomaly Recognition," Neurala Blog, Apr. 21, 2020, 4 pages (https://www.neurala.com/blog/neurala-introduces-anomaly-recognition).

Neurala Announces VIA Software For Quality Inspection in Manufacturing, Neurala Blog, Jun. 11, 2020, 4 pages (https://www.neurala.com/press-releases/neurala-announces-via-software-for-quality-inspection-in-manufacturing).

Neurala Use Case, "Multi-ROI Use Case: Part Kitting," neurala.com, Dec. 14, 2020, 3 pages.

Neurala Use Case, "Neurala VIA for Case Packing," neurala.com, Dec. 14, 2020, 2 pages.

Neurala Use Case, "Neurala VIA for Electronics Component Inspection," neurala.com, Dec. 14, 2020, 3 pages.

Neurala Use Case, "Neurala VIA for Plastic Injection Molding," neurala.com, Dec. 14, 2020, 2 pages.

Neurala Use Case, "Neurala VIA for Surface Inspection," neurala.com, Dec. 14, 2020, 2 pages.

Neurala Whitepaper, "Automating Visual Inspections for Manufacturing with Deep Learning," Jan. 2020, 12 pages.

Neurala, "The Benefits of Applying Artificial Intelligence to Industrial Inspection," neurala.com, 2020, 6 pages.

Extended European Search Report in European App. No. 21738689.5 dated Jan. 23, 2024, 8 pages.

Sarmiento, et al. "Fault detection in reactive ion etching systems using one-class support vector machines." IEEE/ SEMI Conference and Workshop on Advanced Semiconductor Manufacturing 2005.. IEEE, 2005, pp. 139-142.

* cited by examiner

3. Inference Behaviors, Recipes & Workflows

*Brain inferences are given behaviors and applied to compute nodes via recipes.*

212

342

344

340

Parts

Integrated Circuit

SYSTEMS AND METHODS FOR ANOMALY RECOGNITION AND DETECTION USING LIFELONG DEEP NEURAL NETWORKS

CROSS-REFERENCE TO RELATED APPLICATION(S)

This application is a bypass continuation of International Application No. PCT/US2021/013056, filed on Jan. 12, 2021, which in turn claims the priority benefit, under 35 U.S.C. § 119(e), of U.S. Application No. 62/960,132, filed on Jan. 12, 2020. Each of these applications is incorporated herein by reference in its entirety for all purposes.

BACKGROUND

Traditional artificial neural networks (ANNs) and deep neural networks (DNNs), which often include many layers of neurons interposed between the input and output layers, are typically designed to work in either a supervised or unsupervised fashion. Supervised learning produces high-precision, yet rigid structures that do not allow for 'unknown' classes beyond those they are trained to recognize and cannot be easily updated without costly retraining. Unsupervised learning can accommodate and discover unknown input-output mapping but does not usually provide high performance (precision/recall) typical of supervised systems. However, many real-world scenarios often require a combination of supervised and unsupervised ANN capabilities. In many such scenarios, the number of known classes cannot be defined a priori.

For instance, in real-life quality inspection, the number of possible defects that may occur in a production cycle may be impractical or impossible to determine a priori. Therefore, traditional DNNs, which are trained on known mappings between input data and output classes, cannot be used to detect all possible defects in quality inspection. While in these scenarios unsupervised methods can be used (e.g., clustering) to infer defects, these methods do not generally achieve performance comparable to supervised DNNs.

Specifically, supervised ANNs are trained to infer a function from labeled training data (a set of training examples), where each example includes an input object and a desired output label. Using backpropagation to train a supervised ANN requires large amounts of training data and many learning iterations and cannot occur in real-time as data becomes available. ANNs that learn in an unsupervised fashion do not require a desired output value, and are used to preprocess, compress, and find unknown patterns in data. While unsupervised learning can be as time-consuming as supervised learning, several unsupervised learning processes are much faster and computationally simpler than supervised ones and can occur in real-time, namely, in an incremental fashion with each data presentation and with a computational cost either slightly more, or equal to, that of inference.

A supervised DNN is trained to map input (e.g., images) to output (e.g., image labels), where the set of labels is defined a priori and corresponds to the number of output classes provided in the supervised learning process. The DNN designer must provide a priori all the classes that the DNN may encounter during inference (after learning), and the training data should be sufficient for slow backpropagation and balanced in the numbers of examples among the classes that the supervised DNN is supposed to identify. If no training examples are provided for a given class of objects, the traditional neural network has no reason to know that this class of objects exists.

This requirement to provide training examples for every object class makes traditional neural networks challenging to implement successfully for problems like industrial quality control, where precision should be high and the training data includes many consistent examples of a correct product, but very few examples of (inconsistent) incorrect products. In addition, the machine manufacturer may prefer to defer training to the customers so that the training incorporates the most up-to-date examples for each customer. Hence, ANNs and DNNs have not been widely adopted for use in industrial quality control applications due to the data-and-compute intensive nature of the training process, inability to be updated once deployed, and the difficulty in recognizing all possible initially unknown defects.

SUMMARY

Unlike conventional ANNs and DNNs, Lifelong Deep Neural Network (L-DNN) technology can be trained quickly to recognize acceptable or conforming objects and used to detect unknown defects and other anomalies without being trained to recognize those unknown defects or anomalies. This makes L-DNN technology suitable for high-speed visual inspection and quality control in manufacturing assembly lines and other industrial environments. An edge computer running an L-DNN can use camera data or other data to identify defective or misaligned objects in real-time, without human intervention, for removal, repair, or replacement.

L-DNN technology merges (a) the ability of DNNs to be trained with a high precision on known classes, when available, (b) while at the same time be sensitive to any number of unknown classes or class variation that cannot be determined a priori. Additionally, to cope with real-world scenarios, L-DNN technology (c) enables learning to occur when little data is present. L-DNN technology can also learn effectively from unbalanced data (e.g., data with vastly different numbers of examples for different classes) is present. Finally, L-DNN technology allows for (d) real-time learning without slow backpropagation.

L-DNN technology extends Artificial Intelligence (AI), Artificial Neural Networks (ANNs), Deep Neural Network (DNNs), and other machine vision processes so that they can be trained at the point of deployment with minimal and unbalanced data and further updated as new data becomes available. Technical benefits of L-DNN include, but are not limited to:

Reduction of AI latency: because it can be located at the computing edge rather than in the cloud or a remote server, the L-DNN AI can achieve real-time or near real-time data analysis, since data is processed on a processor located directly at the local device level, not on a cloud or data center resource;

Reduction of data transfer and network traffic: since data is processed at the device level, raw data does not need to be transmitted from the device via a computer network to a data center or cloud, thereby reducing network traffic;

Reduction of memory usage: L-DNN technology allows one-shot learning, eliminating the need to store data for future use;

Data privacy: processing data (both inference and learning) at the device enhances user privacy and data security because user data is generated, processed, and discarded at the device level, possibly without being transmitted off the device and without being stored persistently on the device in raw form;

Flexible operation: an L-DNN can operate in supervised, unsupervised, or semi-supervised modes; and Handling of unknown object classes: an L-DNN can identify and report "Nothing I know" for the objects it has not encountered during training, including defective or anomalous parts.

For more on L-DNN technology, see, e.g., U.S. Pre-Grant Publication No. 2018/0330238 A1 and U.S. application Ser. No. 16/952,250, which are incorporated herein by reference in their entireties.

L-DNN is particularly well-suited to the task of industrial visual inspection because, unlike conventional ANNs and DNNs, it can identify images of anomalies without having been trained to identify those anomalies. In visual inspection, an automated inspection system receives data that is most of the time very similar and corresponds to a correct situation (e.g., a good quality product on conveyor belt, regular transaction, machine operating within proper regime). On rare occasions, however, the input data may be different or anomalous (e.g., a defective product, unusual transaction, machine outside of operational regime). Generally, the task of distinguishing the correct data from the different or anomalous data can be termed anomaly recognition (recognizing that an anomaly was presented, e.g., that a 12-pack of aluminum cans includes a defective can) or anomaly detection (locating where the anomaly happens in multidimensional space, e.g., which can in the 12-pack is defective). In anomaly recognition and detection, time can be one of the inputs to the system.

A real-time operating system implementing L-DNN learns new products and new anomalies quickly so that it can respond to the new knowledge almost immediately. Using semi-supervised L-DNN enables a real-time operating system for anomaly recognition and detection that can:

a. Train quickly at the deployment site using only examples of normal situation;

b. Recognize or detect anomalies and alert the user; and c. Optionally update its knowledge with each anomalous datum without disruption of the operation of the system.

L-DNN can be used in a system for inspecting objects on an assembly line. This system may include a sensor and a processor operably coupled to the sensor. In operation, the sensor acquires data representing an object on the assembly line. And the processor executes (1) a pretrained backbone that extracts features of the object from the data; and (2) a fast-learning head, trained only on data representing normal objects, that receives the features from the pretrained backbone and identifies the object as normal or anomalous based on the features. The system may also include a programmable logic controller (PLC) or human-machine interface (HMI) that diverts the object from the assembly line in response to the fast-learning head recognizing that the object is anomalous or alerts the operator to the anomaly in response to an appropriate signal from the processor.

The sensor can be a camera, in which case the data comprises an image of the object. In this case, the fast-learning head can be trained on a relatively small number of images (e.g., 100, 90, 80, 70, 60, 50, 40, 30, 20, 10, 5, or even 1 image). The sensor can also be a strain, vibration, or temperature sensor configured to acquire time-series data representing the object or the environment.

The pretrained backbone can comprises convolutional layers of a neural network trained to recognize normal objects. It can also be configured to extract the features by Fourier transforming or wavelet transforming the data.

The fast-learning head can identify the object as having a previously unseen type of anomaly. In these cases, an operator can use an interface, operably coupled to the processor, to label the previously unseen type of anomaly as a first type of anomaly. If the sensor acquires data of other objects on the assembly line, the pretrained backbone can extract features of the data representing those objects too for automatic anomaly detection by the fast-learning head. The fast-learning head can classify the second object as having a first type of anomaly, if applicable; if the second object has a previously unseen type of anomaly, the operator can use the interface to label that anomaly as a second type of anomaly.

The processor can implement many fast-learning heads, all of which receive and operate on features extracted by the same pretrained backbone. This reduces latency compared to operating a comparable number of backbone/head pairs in sequence. The different heads can identify different objects, different images of the same object, or different regions of interest in the same image or data set from the same set of features extracted by the back. The heads can also be trained to do different things or dedicated to different tasks; for instance, one head may monitor for anomalies while another head may classify objects based on size, shape, position, or orientation from the same extracted features.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
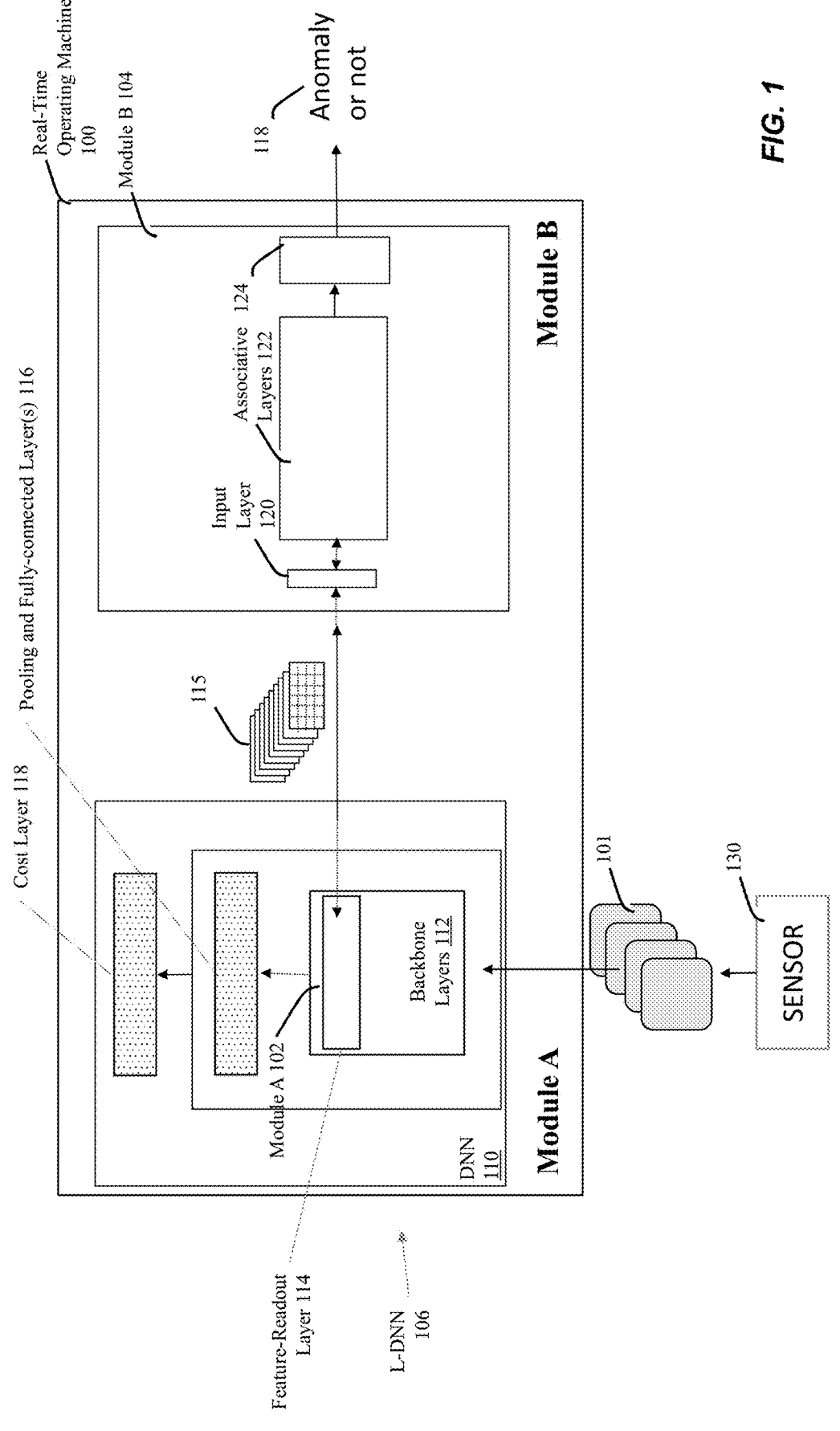
FIG. 1 illustrates a Lifelong Deep Neural Network (L-DNN) implemented in a real-time operating machine.

For years, manufacturers have used Automated Optical Inspection (AOI), or computer vision, to inspect products at various points in the manufacturing process: e.g., in process, labeling, final inspection. Comprised of a camera and software, a conventional AOI system allows rapid inspection while dramatically improving quality and reducing waste. One limitation of a conventional AOI system, however, is that it can't detect variations or anomalies such as surface-level defects, deformations, or perform assembly verifications, etc. To combat this limitation, manufacturers may rely on human inspectors. But human inspectors come with limitations of their own, including imperfect accuracy and/or inconsistencies from person to person. And human inspectors aren't machines: they can't inspect every single part, especially on high-speed lines.

To overcome these limitations, engineers have begun combining traditional computer vision inspection with deep learning. A subset of machine learning, deep learning makes the computation of deep neural networks (DNNs) feasible. On the surface, computer vision and deep learning appear similar; namely, both automate the vision inspection process to deliver several benefits, including increasing the speed of inspections, reducing deviations from line to line, and increasing scalability and the percentage of product that can be inspected efficiently. But there are several differences between these approaches. These differences can be characterized by the types of problems each is best suited to solve. In simple terms, computer vision is better suited to objective or quantitative use cases that can be programmed logically (e.g., "If the part measures 100±0.1 mm, then it's good"), while deep learning is far better suited to subjective or qualitative inspections that involve generalizations or variability (e.g., "that weld looks good").

Computer vision works well for visual inspection when simple logic-based rules can be applied to assess an object's conformity with a desired standard. For example, a computer vision system can verify how and where a part and/or component is oriented or located within the field of view (e.g., to aid in automated picking or as a pre-cursor to a secondary inspection, such as part measurement, below). A computer vision system can also verify the presence or absence of a key component or the completeness of a component/part (e.g., whether a part is broken or missing a component). A computer vision system can measure or estimate the distance between points within a part or component and compare the measurement to specifications or tolerances for pass/fail (e.g., confirming critical part dimensions after milling/molding and prior to further assembly). And a computer vision system can extract data from product labels (e.g., barcodes or quick response (QR) codes for part/component identification, text from labels, etc.).

Deep learning's strength is generalizing, so deep-learning inspection system are well-suited for inspection in variable situations. For example, a deep-learning inspection system can identify variations in type or location of product, part, or defect, such as variations in surface scratches in metals or plastics, weld quality, product being packaged, etc. A deep-learning inspection system can also inspect items in an environment with variations in lighting, reflections, color, etc. (Computer vision systems generally perform poorly in environments with variable illumination and generally cannot assess variations from object to object.)

A conventional deep-learning inspection system must be trained to recognize the objects that it is inspecting. Training has to be done with data, such as labeled or tagged images, that closely resemble what the deep-learning model will actually process in a production deployment. This means that the training data for a deep-learning inspection system should be acquired with same camera, from the same perspective and at the spatial resolution, and ideally with the same lighting as will be used during production deployment, although some variation will be generalized over by the system.

In addition, the training data should contain an approximately equal number of labeled images for each type or class of things that the deep-learning inspection system is supposed to identify. For example, if the deep-learning inspection system should classify "good" and "no good" objects, then the training set should have an approximately equal number of examples (labeled images) of objects in each of these classes. The amount of training data needed to train the deep-learning inspection system depends on several variables, including the desired accuracy, variability, and number of classes of objects. In general, higher accuracy, greater variability, and more classes translate to more training data. It isn't unusual for training data to comprise over a 1,000 labeled images or more per class.

For industrial and manufacturing use cases, however, it can be difficult or impossible to generate enough training data to train a deep-learning system to recognize defects for at least two reasons. First, it is hard to generate enough (e.g., 2,000) images of defective products because modern manufacturing processes have significantly increased yields and reduced error and waste. Sourcing a balanced and representative training data set is an expensive proposition in and of itself. Second, it can difficult or impossible to identify all of the possible types of defects to recognize. While some types defects of may be predictable, other types of defects may be impossible to predict because the conditions that cause them are unknown ahead of time. This lack of data (labeled images) of different defects makes it challenging, if not impossible, to train a conventional deep-learning inspection system to recognize (different types of) defects.

A conventional deep-learning inspection system classifies input data into one of the classes it has been taught to recognize. Training a conventional deep-learning inspection system on an imbalanced training data set (e.g., one that does not include or has very few labeled images of defective parts) leads to bias and a lack of accuracy as the system makes decisions about classifying the input data. As a result, a conventional deep-learning inspection system trained only on good/normal data can only identify anomalous objects as good or normal, albeit perhaps with lower confidence.

Unlike a conventional deep-learning inspection system, an L-DNN-based inspection system can identify different types of defects and other anomalies without being trained to recognize them specifically. In addition, an L-DNN-based inspection system can be trained to recognize normal or good objects on a smaller training data set than conventional deep-learning inspection systems. And, unlike a conventional deep-learning inspection system, an L-DNN-based inspection system can learn to recognize new objects, including previously unseen objects, after it has been deployed and while running on the compute edge (e.g., on a processor coupled to a factory floor inspection camera).

In short, an L-DNN-based inspection system can perform anomaly recognition. Anomaly recognition works by training a model on "Good" image data only (an imbalanced training data set). Establishing a threshold for deviations from this "Good" data enables the system to identify images that deviate from the norm. Over time, as the system identifies and captures an increasing number of images of anomalies, the system, with the help of the operator, can attach labels to these images to form new anomaly classes and transition from anomaly recognition to a more granular anomaly classification.

The L-DNN, also called a "Brain" or model, that provides the artificial intelligence of an L-DNN-based inspection system can be created and optimized on a training system (e.g., a local or cloud server running the Neurala Brain Builder Software-as-a-Service (SaaS) product) and trained on images or other data representing only acceptable or normal objects. The trained L-DNN can then be deployed to one or more nodes, each of which includes an edge computer connected to a camera, microphone, scale, thermometer, or other sensor that acquires input data. For example, each edge computer may be connected to a camera that complies with the GigE Vision Standard (e.g., a Basler, Baumer, or Teledyne DELSA camera). The training system is easily integrated into an industrial machine or manufacturing line using standard interfaces such as PLC I/O and Modbus TCP.

As discussed in greater detail below, the training system can train the L-DNN to recognize one or more categories or classes of "good" input data. For example, it can train the L-DNN on images of desired surface quality, packaging, or kitting. Because the L-DNN is trained on only "good" images, the deployed L-DNN-based inspection system identifies images as anomalous if they don't match the good images closely enough.

An L-DNN-based inspection system offers several technical advantages over conventional automated inspection systems. First, it can recognize anomalies without being trained on data representing those anomalies. This eliminates the time-consuming and often impractical or difficult task of collecting images depicting defective, unacceptable parts. Second, it can be trained to recognize acceptable parts with a smaller training data set than a conventional deep-learning inspection system. This training data set can be imbalanced, e.g., it can be composed of data that represents only acceptable parts and not defective or unacceptable parts. This makes training faster, easier, and less expensive. The faster, easier training makes easier to adapt the L-DNN-based inspection system to inspect different products. Third, as the L-DNN-based inspection system operates, it can learn to identify (and optionally classify, with human supervision)

different kinds of defects with increasing accuracy. Fourth, because the L-DNN runs on an edge device, it does not have to transmit data to other devices. This reduces network bandwidth consumption and keeps the data private and secure.

Lifelong Deep Neural Network (L-DNN) Technology

L-DNN technology combines a representation-rich, DNN-based subsystem (Module A) with a fast-learning subsystem (Module B) to achieve fast, yet stable learning of features that represent entities or events of interest. These feature sets can be pre-trained by slow learning methodologies, such as backpropagation. In the DNN-based case described here (other feature descriptions are possible by employing non-DNN methodologies for Module A), the high-level feature extraction layers of the DNN serve as inputs into the fast learning system in Module B to classify familiar entities and events and add knowledge of unfamiliar entities and events on the fly. Module B can learn important information and capture descriptive and highly predictive features of the correct input or behavior without the drawback of slow learning, plus identify incorrect input and behaviors without ever having seen them before.

An L-DNN also enables learning new knowledge without forgetting old knowledge, thereby mitigating or eliminating catastrophic forgetting. In other words, the present technology enables real-time operating machines (e.g., a computer that runs on the clock of the production line), such as computers, smartphones, or other computing devices, to (continuously and/or continually) adjust behavior at the edge based on user input without (a) needing to send or store input images, (b) time-consuming training, or (c) significant computing resources. Learning after deployment with an L-DNN allows a real-time operating machine to adapt to changes in its environment and to user interactions, handle imperfections in the original data set, and provide customized experience for each user. In the anomaly recognition or detection cases, it is especially useful as the system can start with a highly unbalanced dataset, in the extreme case without any examples of anomalies, and discover and add anomalies to its knowledge of what is a good product or correct behavior while it operates.

Here, L-DNN technology is used for monitoring manufacturing and packaging lines. L-DNN creation software, for example, Neurala Brain Builder, may be used to create and deploy versions of one or more different L-DNNs or Brains, each of which monitors data from at least one sensor. This sensor data may be one-dimensional (e.g., time series data from a sensor that monitors motion of a rotating cam) or two-dimensional (e.g., images from a camera that takes pictures of packages before they are sealed). In either case, the L-DNN's feature extractor (Module A, implemented as, e.g., a feedforward DNN, a recurrent DNN, fast Fourier transform (FFT) module, or a wavelet transform module) extracts features from the data. The Module B classifier classifies the extracted features as either normal or anomalous. If the extracted features are anomalous (e.g., the machinery is wobbling outside of operating limits or the package contains broken components), then the L-DNN based quality monitoring system may trigger some sort of corrective action (e.g., slowing or stopping the machine or diverting the package off the packing line before the package is sealed).

L-DNN implements a heterogeneous neural network architecture to combine a fast learning mode and a slow learning mode. In the fast learning mode, the real-time operating machine implementing the L-DNN learns new knowledge and new experiences (e.g., anomalies) quickly so that it can respond to the new knowledge almost immediately. In this mode, the learning rate in the fast learning subsystem is high to favor new knowledge and the corresponding new experiences, while the learning rate in the slow learning subsystem is set to a low value or zero to preserve old knowledge and the corresponding old experiences. Fast learning mode is the primary mode of operation for the anomaly detection system for industrial inspections, as it may be costly to take the system offline for a slow training update.

FIG. 1 provides an overview of an L-DNN 106, which can be implemented in a real-time operating machine 100. The real-time operating machine 100 receives sensory input data 101, such as video or audio data, from a sensor 130, such as a camera or microphone, and feeds it to an L-DNN 106 comprising a slow-learning Module A 102 and a fast-learning Module B 104, which can be implemented as neural network classifier. Module A 102 can be based on a pre-learned (fixed weight) DNN 110 or some other system and serves as a feature extractor. Module A 102 receives the sensory input 101. A stack of pretrained neural network layers 112, also called a backbone 112, identifies and extracts the relevant features into compressed representations of objects 115 and feed these representations 115 to Module B 104. Frequently when using a DNN-based module A, the features are read out from some intermediate layer 114 of the DNN that is at the end of a feature-extracting backbone 112. The DNN's upper layers, which may include one or more fully connected, averaging, and pooling layers 116 and a cost layer 108, may be ignored or even stripped from the DNN 110 altogether.

Module B 104 learns these object representations 115 quickly by forming associations between signals in an input layer 120 and an output layer 124 in a set of one or more associative layers 122. In supervised mode, through the interactions with the user, Module B 104 receives correct labels for the unfamiliar objects in layer 124, quickly learns the association between each feature vector in layer 120 and corresponding label, and as a result can recognize these new objects immediately. In unsupervised mode, the system uses feature similarities between vectors to assign these vectors into the same or different classes.

The L-DNN 106 takes advantage of the fact that the DNN 110 is an excellent feature extractor. The Module B 104 continuously processes the features extracted by Module A 102 as the input source (sensor) 130 provides data 101. Module B 104 uses fast, one-shot learning to associate these features with object classes.

In fast learning mode, when a novel set of features corresponding to a normal (non-anomalous) case is presented as input 101, Module B 104 associates these features with a class label that is either given by the user in supervised mode or generated internally in unsupervised mode. In either case, Module B 104 is now familiar with this input and can recognize it on the next presentation. This classification by Module B 104 serves as an output of the L-DNN 106 either by itself or in combination with an output from a specific DNN layer from Module A 102, depending on the task that the L-DNN 106 is executing.

Since L-DNN in general and Module B in particular are designed to operate in real time on continuous sensory input, a neural network in Module B should not be confused by unfamiliar objects. A conventional neural network targets predefined datasets that usually contain a labeled object in the input; as a result, it does not need to handle inputs without familiar objects present. Thus, to use such a network in Module B of an L-DNN, an additional special category of "nothing I know" should be added to the network to alleviate Module B's attempts to erroneously classify unfamiliar objects as familiar (false positives).

This concept of "nothing I know" is especially useful when processing a live sensory stream that contains (exclusively) previously unseen and unlabeled objects. It allows Module B and the L-DNN to identify an unfamiliar object as "nothing I know" or "not previously seen" instead of potentially identifying the unfamiliar object incorrectly as a familiar object. Extending the conventional design with the implementation of "nothing I know" can be as simple as adding a bias node to the network. "Nothing I know" can also be implemented in a version of the L-DNN that automatically scales its influence depending on the number of known classes of objects and their corresponding activations. "Nothing I know" is very useful for anomaly detection applications, as every time the L-DNN system does not recognize its input as something familiar, it can raise an anomaly flag 118 in response to a "nothing I know" classification, alerting the user.

For more on L-DNNs, please see U.S. Pre-Grant Publication No. 2018/0330238 A1, entitled "Systems and Methods to Enable Continual, Memory-Bounded Learning in Artificial Intelligence and Deep Learning Continuously Operating Applications Across Compute Edges," and PCT Publication No. WO 2019/226670, entitled "Systems and Methods for Deep Neural Networks on Device Learning (Online and Offline) with and without Supervision," which are incorporated herein by reference for all purposes.

Industrial Inspection and Monitoring Using an L-DNN Platform

Figure 2:
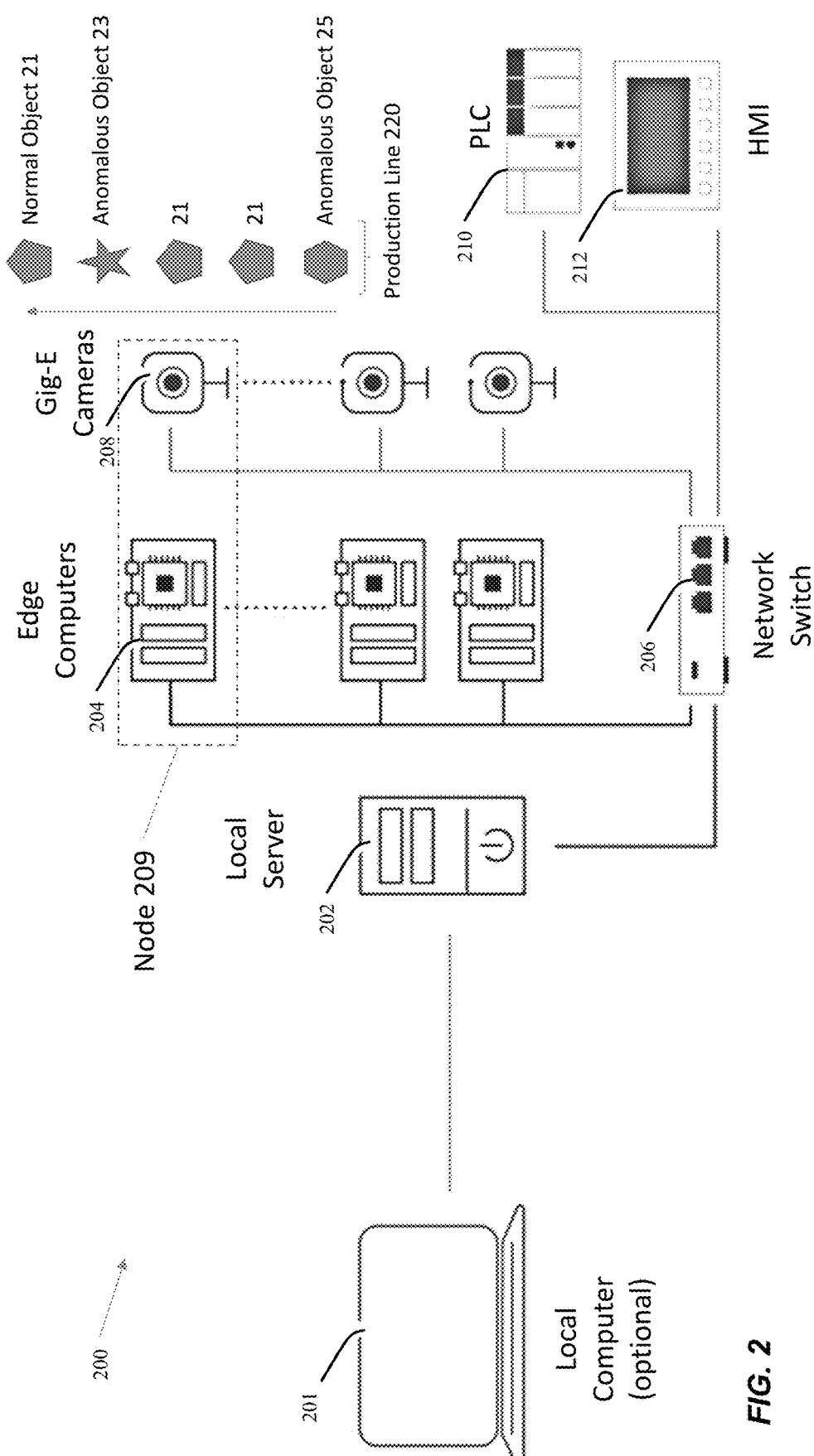
FIG. 2 illustrates a Visual Inspection Automation (VIA) platform for creating and deploying Brains (L-DNNs) for manufacturing inspection, with an on-premises solution tailored for a visual inspection task.

FIG. 2 shows a Visual Inspection Automation (VIA) platform 200 based on L-DNN technology as an example of a system that can enable visual inspection on a factory floor. The VIA platform 200 includes software running on one or more processors with a Graphical User Interface (GUI) that enables a user to configure, train, deploy, and further refine an L-DNN system. The VIA platform 200 includes a local industrial PC (local server) 202 and L-DNN training (e.g., Brain Builder) software running on a laptop 201 or computer connected to the industrial PC 202 for initial setup and training. The VIA system 200 also includes edge computers 204. Each edge computers 204 is coupled to a corresponding camera 208 or other sensor, such as a microphone, counter, timer, or pressure sensor, that collects the data for evaluation or inspection to form a corresponding node 209. Each node 209 can include a different type of sensor and can implement an L-DNN trained to recognize normal and anomalous data acquired by that sensor.

The VIA system 200 is integrated into an industrial machine or manufacturing line using standard interfaces, such as Programmable Logic Controllers (PLCs) 210, I/O and Modbus TCP, via a switch 206, and can include one or more Human-Machine Interfaces (HMIs) 212. In FIG. 2, the HMI 212 is connected to a PLC 210. The customer-defined logic is implemented in the PLC 210 and/or HMI 212 to implement any actions resulting from the output of the VIA system 200. For example, when VIA system 200 recognizes an instance of a product as anomalous, the PLC 210 can trigger the automatic removal of this instance from the production line.

The local server 202 and L-DNN training software running on the laptop 201 build and deploy Brains to the edge computers 204. The edge computers 204 run software (called Inspectors) that use the trained Brains, which can be thought of parameter sets (e.g., neural network weights) representing trained L-DNNs, to process data from the cameras 208 and/or other sensors. Once the Brains have been deployed, they can be used to recognize and locate anomalies in parts or other objects being produced, sorted, and/or packaged in the factory. They can also communicate with each other, possibly sharing information newly detected types of anomalies, via the network switch 206 (e.g., as disclosed in U.S. Pre-Grant Publication No. 2018/0330238 A1, which is incorporated herein by reference in its entirety).

In operation, the L-DNN-based VIA system 200 in FIG. 2 can inspect components, sub-assemblies, and/or finalized products in a synchronized manner dictated by the takt time of the production process. The takt time is the time to produce parts divided by the number of parts demanded in that time interval. For inference, if demand is for 60 parts in one hour, the takt time is one minute. The L-DNN inference time (the time that the L-DNN takes to classify an image as normal or anomalous) should be less than this takt time.

In FIG. 2, the VIA system 200 inspects normal objects 21 and anomalous objects 23 and 25 traveling past the cameras 208 on a conveyor belt of inspection line or production line 220. The cameras 208 acquire still or video images of the objects and transmit them via the network switch 206 to respective edge computers 204, which implement respective L-DNNs. These L-DNNs are trained to recognize the normal objects 21 but not the anomalous objects 23 or 25. When the L-DNN is presented with an image of a normal object 21, it classifies the image as an image of a normal object 21 (e.g., a "good" image). When the L-DNN is presented with an image of a deviant or anomalous object 23 or 25, it indicates that the image is of a deviant or anomalous object.

The L-DNN can be trained to recognize images of just about any sort of object or to recognize patterns in other type of data, including spectral data, audio data, or other electrical signals. For example, the L-DNN can be trained to recognize loaves of bread or other processed foods at different points in the baking process. A first camera 208 may be positioned to image the loaves before they are baked, e.g., to ensure that the bread pan is filled appropriately and that the surface is correct (e.g., bubbles vs. no bubbles) so that the bread will both bake properly and to ensure the proof. A second camera 208 may image the bread as it comes out of the oven, e.g., on a conveyor belt that runs through the oven. The L-DNN on the edge computer 204 coupled to the second camera 208 may inspect images of the baked bread for color (to determine doneness); distribution of an ingredient sprinkled on top (e.g., chocolate chips, poppy seeds, sesame seeds, etc.), and shape.

L-DNN is particularly well-suited to these mostly subjective inspections like these, which cannot be performed effectively with a conventional computer vision system. And because the possible types of anomalies are nearly endless, it may be difficult or impossible to train a conventional deep-learning network to recognize them all. Inspection by hand is time consuming and typically involves a few loaves. It can be inconsistent, making it difficult to reach the desired uniformity. In contrast, the VIA system can automatically inspect every loaf, leading to higher yield, better consistency, and reduced waste, and identify anomalies without being trained to recognize them.

The VIA system 200 in FIG. 2 can also be configured to inspect different manufactured goods, including injection-molded plastic parts. Plastic molded parts are used in many different manufactured goods, from consumer electronics to cars and beyond. A contract manufacturer making plastic molded part may mold and deburr the parts before sending them in bulk to a customer. Conventionally, a person may inspect only fraction of these parts, e.g., one out of every ten plastic molded parts. However, this only is to ensure that in general they are sending good parts. The customer manually inspects every part before using it in assembly.

A GigE camera 208 installed on the assembly line images the parts after deburring. The camera 208 sends the images to an edge computer 204 either directly or via a network switch 206. The L-DNN running on the edge computer 204 classifies the parts appearing the images as either normal (properly molded and deburred) or anomalous (not molded and/or deburred properly). If the part is anomalous, the edge computer 204 may trigger a switch (not shown) on the conveyor belt via a gateway (e.g., a Modbus TCP to OPC Unified Architecture) to a PLC to indicate defective parts and remove them from the line. A human operator can inspect the defective parts and determines which ones to scrap and which ones can be reworked.

An L-DNN-based VIA system 200 is particularly well-suited for inspecting injection-molded parts made on assembly lines where the types of parts being made change frequently, e.g., for prototyping or small batches. This is because the L-DNN can be trained rapidly, on small training sets, to recognize new parts. In addition, the L-DNN can flag atypical or aberrant parts without ever having seem them before.

An L-DNN-based VIA system 200 can also be used to monitor continuous data and/or 1D data. For example, a VIA system can monitor continuous or sampled temperature, strain, or vibration data for patterns indicating or suggesting that a particular part or component is worn or should be maintained or replaced. The feature extractor may take the fast Fourier transform or wavelet transform of 1D vibration sensor data and extract different spectral components or wavelets from that data for analysis by the classifier, which recognizes a particular spectral or wavelet distribution as normal and other spectral or wavelet distributions as abnormal or anomalous. In response to detecting the abnormal spectral or wavelet distribution, the classifier sets a maintenance alarm for human intervention.

L-DNN Training for VIA System Deployment

Unlike a conventional deep-learning network, an L-DNN can be trained quickly on a small, unbalanced data set. Moreover, an L-DNN can learn to recognize new objects quickly without forgetting how to recognize previously learned objects, unlike a conventional deep-learning network which learns through slower backpropagation. A conventional deep-learning network is also subject to catastrophic forgetting, or the inability to recognize objects it has been trained to recognize. This makes it easier and faster to re-configure an L-DNN inspection system than a deep-learning network inspection for inspecting new or different objects.

Figure 3A:
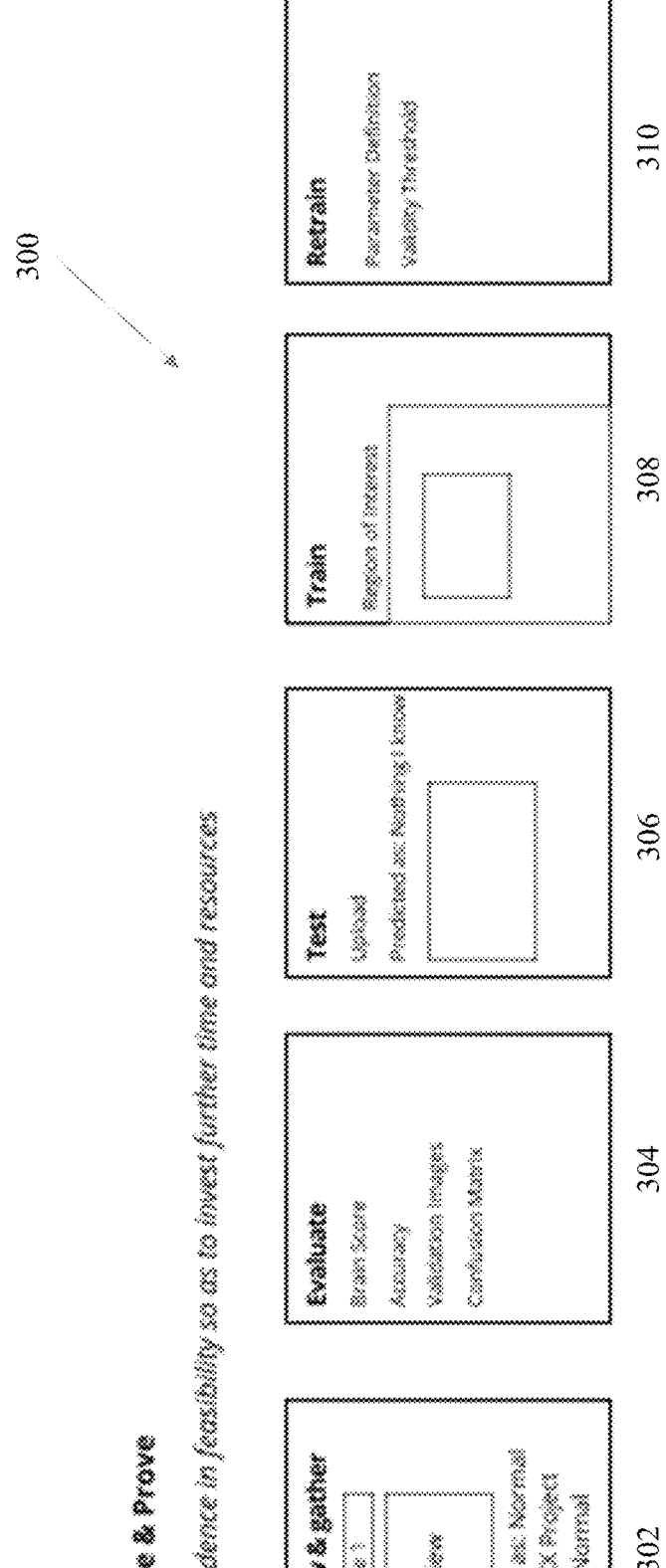
FIG. 3A shows a process for prototyping and proving an L-DNN for deployment to a VIA platform.
Figure 3B:
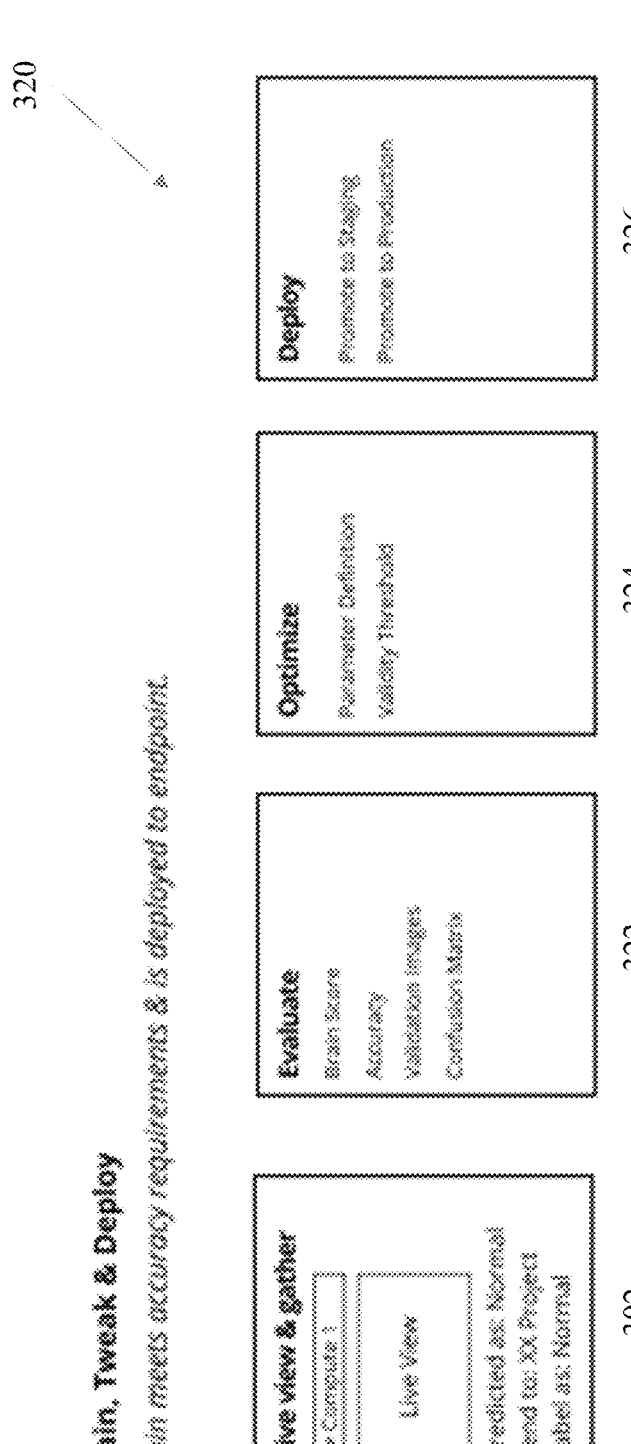
FIG. 3B shows a process for training, tweaking (adjusting), and deploying an L-DNN on a VIA platform.
Figure 3C:
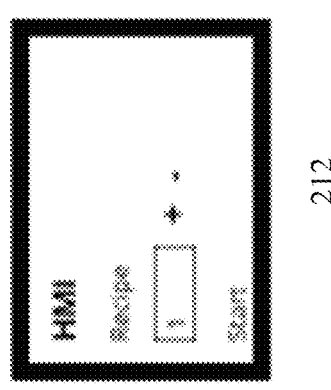
FIG. 3C shows a process for creating inference behaviors to be executed on a VIA platform in response to inferences by an L-DNN.
Figure 3C:
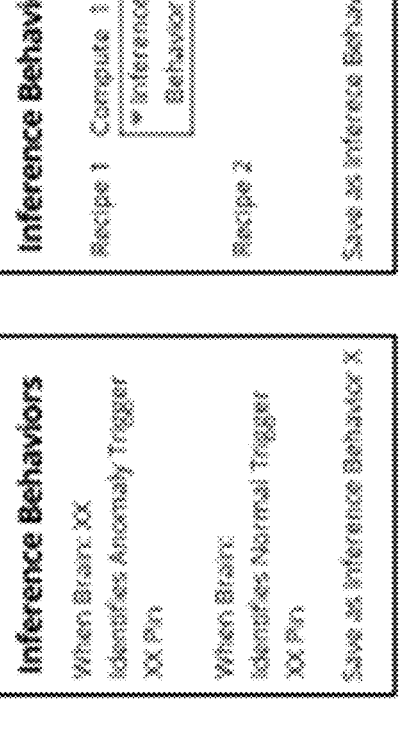
Figure 3C:
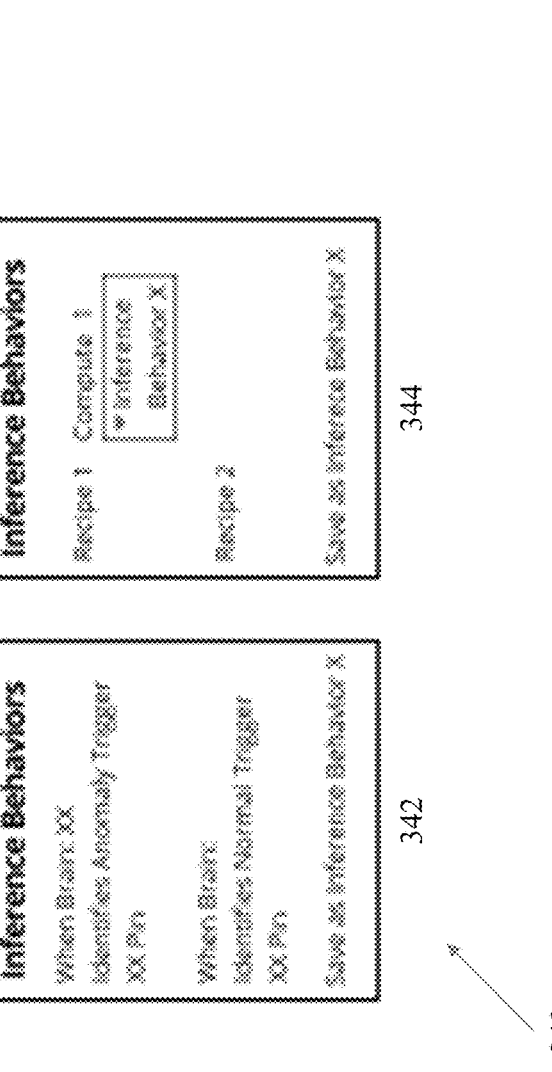

FIGS. 3A-3C show an example workflow of the VIA platform system 200 in FIG. 2 broken down into three phases of user interaction. This workflow is a process for building and deploying Brains (trained L-DNNs) to the edge computers 204. Before investing time and effort into mass-producing the hardware setup shown in FIG. 2, the user should prototype and prove feasibility of the planned system in a "Prototype & Prove" stage 300 using the Brain Builder component of the VIA system 200. This stage 300, shown in FIG. 3A, involves creating and deploying a prototype Brain using the local computer 202 and/or local server 204 and includes the following steps.

In the first step 302 of the "Prototype & Prove" stage 300, a person sets up a camera and/or other sensor(s) to acquire live data of the assembly line/production environment.

When acquiring image data with a camera, the person sets the image capture environment to ensure proper lighting, focus, and quality of the images captured by the camera(s) 208 (FIG. 2). Once the environmental parameters are set, the local computer 202 and/or local server 204 can gather images or other data directly from the camera(s) 208 and/or other sensor(s). For example, these images may be from a camera monitoring a single production line in a factory with many production lines.

The Brain Builder training software running on the local computer 202 and/or local server 204 produces feedback in the form of predictions as data is collected, informing the user of the learning progress of L-DNN and probability of use case success. It trains the head of the L-DNN (the backbone or feature extractor can be trained ahead of time). Once the user see consistency in predictions (e.g., after about 10 "normal" images have been collected), they can evaluate and analyze how well the L-DNN, also called a "Brain," is learning (step 304). At this point, the user can test the Brain against images of normal and/or anomalous objects (step 306) and adjust the training parameters accordingly. The user can also, optionally, use the training workspace to apply a Region of Interest (explained below) (308), retrain (310), and/or reevaluate (304) the Brain, with more testing (306) as desired.

Once the Brain scores acceptable test results, the workflow can proceed to the Train, Tweak & Deploy stage 320. (The "Prototype & Prove" stage 300 may just be for proof of concept, hence the initial training in this stage 320.) This stage 320 involves creating, training, and deploying Brains (L-DNNs) to the Edge Computers 204. To start, the user utilizes the same Live View & Gather functionality 302 as in the "Prototype & Prove" stage 300 to collect a larger, broader dataset of normal/good images. These images are automatically annotated as good/normal and added to the training dataset as they are collected. If the prototype scenario is the same as or similar enough to the actual scenario, Brain Builder can automatically annotate images (and may be mostly correct) based on prototyping session (human supervision may provide additional certainty).

Once adequate data has been collected, the user can evaluate (322) and test the trained L-DNN. To do this, the user may add available examples of "anomalies" to the validation set used for testing and run the L-DNN on the validation set to get an accuracy score. The user can then adjust any parameters related to a validity threshold and run optimization 324 before deployment 326 of the Brain to an endpoint. The validity threshold is the distance between what is considered normal and what is considered an anomaly. A validity threshold slider allows users to adjust the specific point where the object deviates from normal sufficiently to be considered anomalous.

Training can be relatively quick. In one real-life scenario, a Module A extracted features from a 1D vector for classification by Module B (the classifier), which detected anomalous changes in the sensory readings for real-time, constant monitoring. Module A (the feature extractor) converted 1D time-series data from a single sensor from the temporal domain to the spectral domain using a fast Fourier transform. It fed the resulting spectrum to Module B for classification, producing the following results: training on 100 examples of normal operation and predicting on 100 examples of normal operation and 100 anomalous examples produced two cases of classifying anomalies as normal operations (false positive), and eight cases where normal operation was classified as an anomaly (false negative). The other examples in this trial were classified correctly. Module B has a dominance parameter (discussed below) that allows a user to tweak the balance between false positives and false negatives to match the user preferences.

An L-DNN can be trained on thousands of fewer samples than a conventional deep-learning network. In one case, an L-DNN was trained on 5 samples per class versus 10,000 samples per class for a comparable conventional deep-learning network. On average, an L-DNN can be trained on 20-50 samples per class. More generally, 100 or fewer normal samples (e.g., 100, 90, 80, 70, 60, 50, 40, 30, 20, 10, 5, or even 1 image of a normal image) may be enough to train the head of the L-DNN. In restricted conditions such as those found in manufacturing inspections, where the objects, lighting, and camera angle are supposed to be identical from image to image, an L-DNN may be trained on as few as one sample per class.

The final stage—the Inference Behaviors, Recipes & Workflows stage 340—connects the L-DNN system (Brain) to the actions of the quality control system. Once the user has met their accuracy goals, they assign actions, called inference behaviors, to an inference by the trained L-DNN that an object is normal or anomalous (342). For example, an inference behavior may be to remove an anomalous (defective) part from the assembly line by triggering a pin via the PLC 210. Generally, inferences may include no action for normal parts/operating conditions or corrective action (e.g., alert maintenance, stop machine, or push part/package off inspection line by triggering a pin via the PLC 210) in response to detection of an anomaly by the L-DNN/VIA system 200. Inference behaviors can be assigned to compute nodes 209 via recipes (344), which can be selected and run via the HMI 212.

Figure 4:
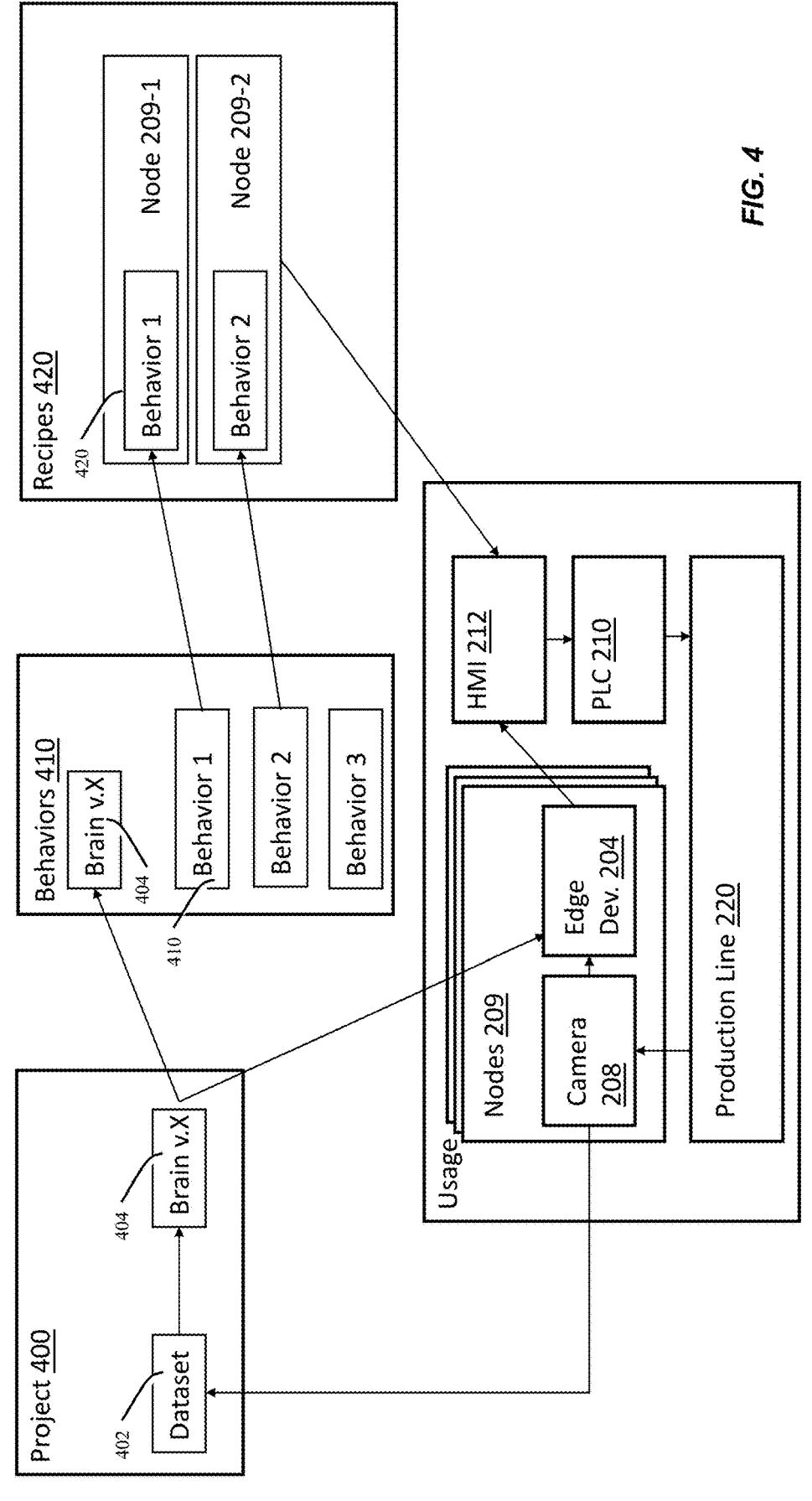
FIG. 4 shows relationships among projects, datasets, inferences, and recipes for creating and deploying versions of Brains in the environment of FIG. 2 and the workflow of FIG. 3.

FIG. 4 illustrates the relationship among projects 400, datasets, inference behaviors 410, recipes 420, and Brain (trained L-DNN) use. A project 400 has a group of datasets 402, which may include sample data, such as images of normal objects, that are used to train a model (Brain) 404. Copies or versions of the Brain are deployed to endpoints (e.g., Edge Computers 204 accessible via an Application Programming Interface (API)). Each Brain Version 404 (Brain v.X) is associated with an inference behavior 410. An inference behavior 410, or simply behavior, is a group of one or more actions assigned to a Brain Version 404 created by assigning relationships between one or more classes of recognized objects as well as anomalous objects and one or more pins in the input/output transmitter 212 used to communicate with a PLC 210. When a Brain Version recognizes an object in a particular class or flags an anomalous object, the corresponding edge node 204 actuates the HMI 212, causing the PLC 210 to effect an action on or by the production line 220 (e.g., divert an anomalous part), such as automatically rerouting the defective part, triggering an alarm, or stopping the production line.

A recipe 420 is a collection or sequence of behaviors 410 assigned to one or more nodes 209 (e.g., nodes 209-1 and 209-2 as in FIG. 4). A user can create a recipe 420 by defining sequences of behaviors 410 to be executed by different compute nodes 209, each of which is assigned one behavior that correlates its Brain. Additional workflows can be set up to enable inference images to be stored for review, sent to training data, etc.

Multihead L-DNN for Industrial Visual Inspection

To reduce inference times when inspecting images from many cameras or many regions of interest (ROIs) in a single image, an L-DNN can implemented as a Multihead L-DNN with a single Module A with a pretrained, slow-learning backbone that feeds multiple Module Bs (classifiers or heads). A Multihead L-DNN can analyze images from multiple inspection points in a single assembly, inspection, or production line and/or multiple ROIs in a single image. Like a single-head L-DNN, a Multihead L-DNN can also be trained to operate on other types of data, include audio data and signals from scales, thermometers, counters, and other sensors.

Multihead L-DNN capitalizes on the fact that features in data are consistent within the sensory domain. For example, images may show edges, corners, color changes, and so forth. Similarly, acoustic information captured with different microphones in the same environment can be decomposed into features based on correlated frequencies and amplitudes, regardless of the sound source. Therefore, there is no need to train multiple Modules A for the same domain because they will all produce qualitatively similar feature vectors. A single Module A per domain (and sometimes per accuracy or speed requirement) can extracts features for processing by one Module B for each sensor. Given that processing time for Module A constitutes 75% or more of a total processing time of L-DNN, Multihead L-DNN allows significant processing cost reduction for the inspection systems with multiple sensors in each domain.

Even when the images come from different cameras in different inspection points, they all can be processed through the same Module A for feature extraction, and then go to different Modules B for classification and final analysis. Multihead L-DNN inherits all the benefits of L-DNN, including reduced AI latency, reduced data transfer and network traffic, reduced memory usage, enhanced data privacy and protection, flexible operation, and the ability to handle unknown object classes.

The Multihead L-DNN adds the following benefits or advantages to single-head L-DNN. First, a Multihead L-DNN can support several inspection points with a single compute host connected to multiple cameras. Second, a Multihead L-DNN can support a many inspection points (ROIs) in a single image with a single compute host connected to a single, higher resolution camera with a wider angle lens. Third, a Multihead L-DNN can run multiple models on the same data (image) input in parallel (e.g., one model to predict orientation, one to predict variant of product, and one to identify defects). These Multihead L-DNN lower the cost of the compute and camera hardware required to perform complex visual inspection tasks with AI, yet within takt time allowance for inference latency.

Figure 5A:
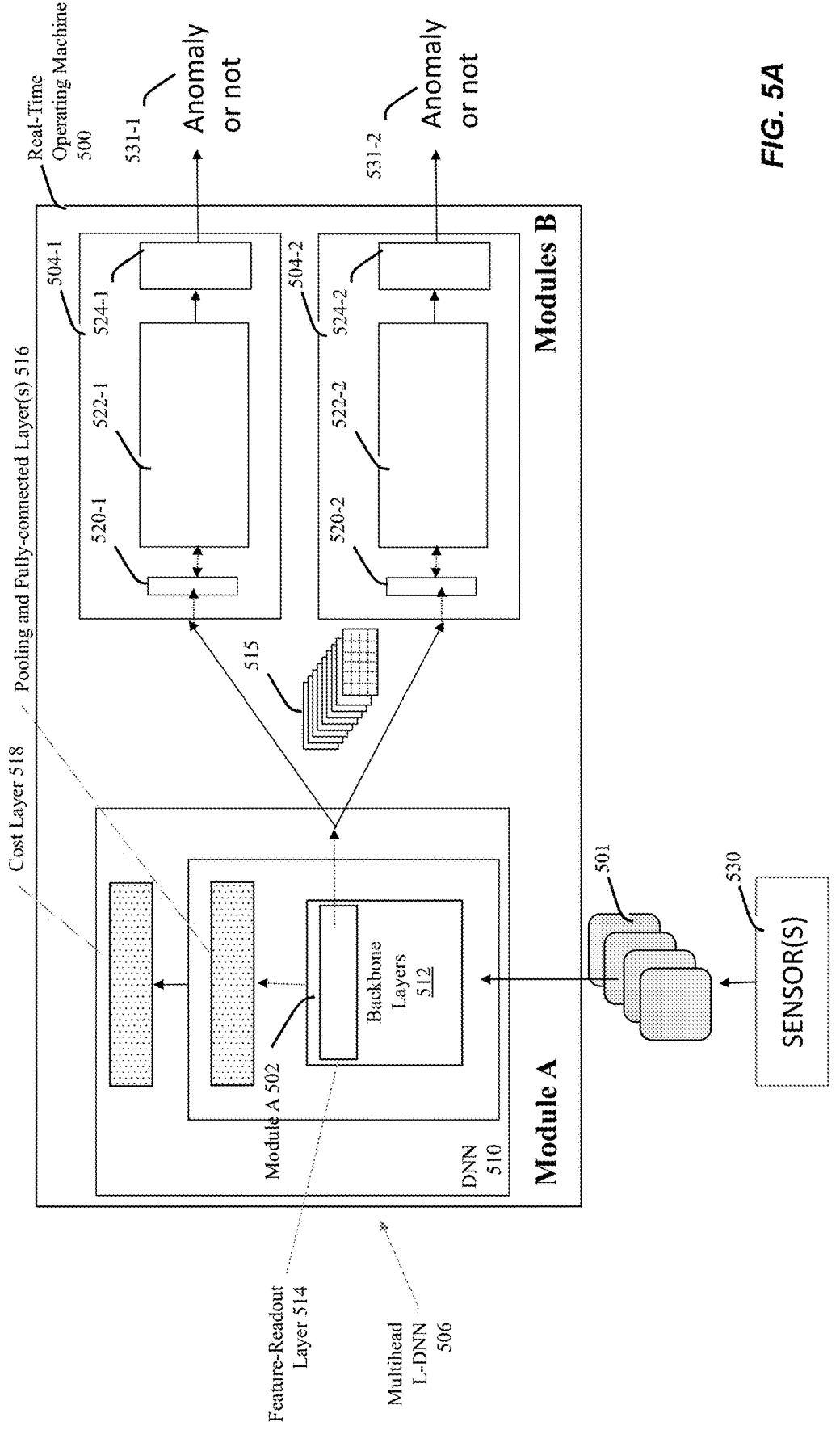
FIG. 5A illustrates a Multihead L-DNN implemented in a real-time operating machine.

FIG. 5A illustrates a Multihead L-DNN 506 running on a real-time operating machine 500, such as an edge computer 204 (FIG. 2). The Multihead L-DNN 506 includes a single Module A 502 created from an original DNN 510. Module A 502 includes stacked neural network layers 512, also called a backbone, and ends in a feature-readout layer 514. The remainder of the DNN 510, such as one or more pooling and fully-connected layer(s) 516 and a cost layer 518, are used to pretrain the backbone 512. They do not participate during L-DNN operation. The backbone 502 is trained to extract features 515 from input data 501 from one or more sensors 530, such as GigE cameras 208 or other devices as described above with respect to FIG. 1.

The backbone 512 in Module A 502 sends the extracted features to several heads 504 (Modules B), each of which is trained on a different data set to recognize a different feature. Just like a Module B in a single-head L-DNN, each head 504 learns these object representations or feature sets 515 quickly by forming associations between signals in its input layer 520 and its output layer 524 in a set of one or more associative layers 522. Each head 504 can operate in supervised mode or unsupervised mode, as described above, and outputs an inference 531 indicating whether the input data is expected (normal) or unexpected (anomalous). Each combination of a backbone 512 and a head 504 is called a network, so Multihead L-DNN effectively does inference concurrently on multiple networks. If each head 504 is trained to recognize a different set of features, the Multihead L-DNN 506 can process inputs from multiple inspection points without a need for a specific full DNN trained for each of these inspection points.

Figure 5B:
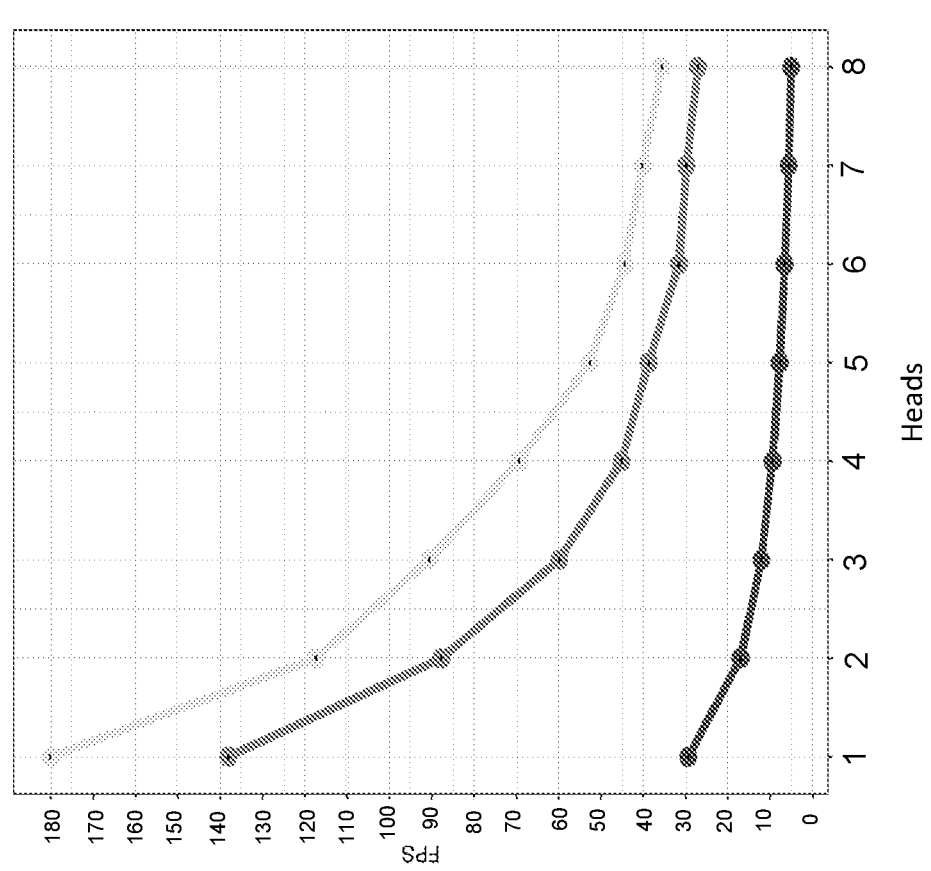
FIG. 5B shows example performance results for Multihead L-DNN in inference frames per second versus the number of heads in the system.

FIG. 5B shows the inference speed in frames per second for Multihead L-DNNs running on three computational platforms: Intel's OpenVINO, Nvidia's TensorRT, and Neurala's custom software development kit (SDK). In all three cases, there is a sublinear decrease in inference speed with respect to the number of heads. For two heads, FIG. 5B shows a 30% speed increase on TensorRT, a 25% speed increase on Neurala SDK, and a roughly 20% speed increase on OpenVINO comparing to two single-head L-DNNs run sequentially on the same data. For eight heads, the speed increase jumps to 55% for TensorRT and Neurala SDK and to about 40% for OpenVINO comparing to eight single-head L-DNNs run sequentially on the same data.

Figure 6A:
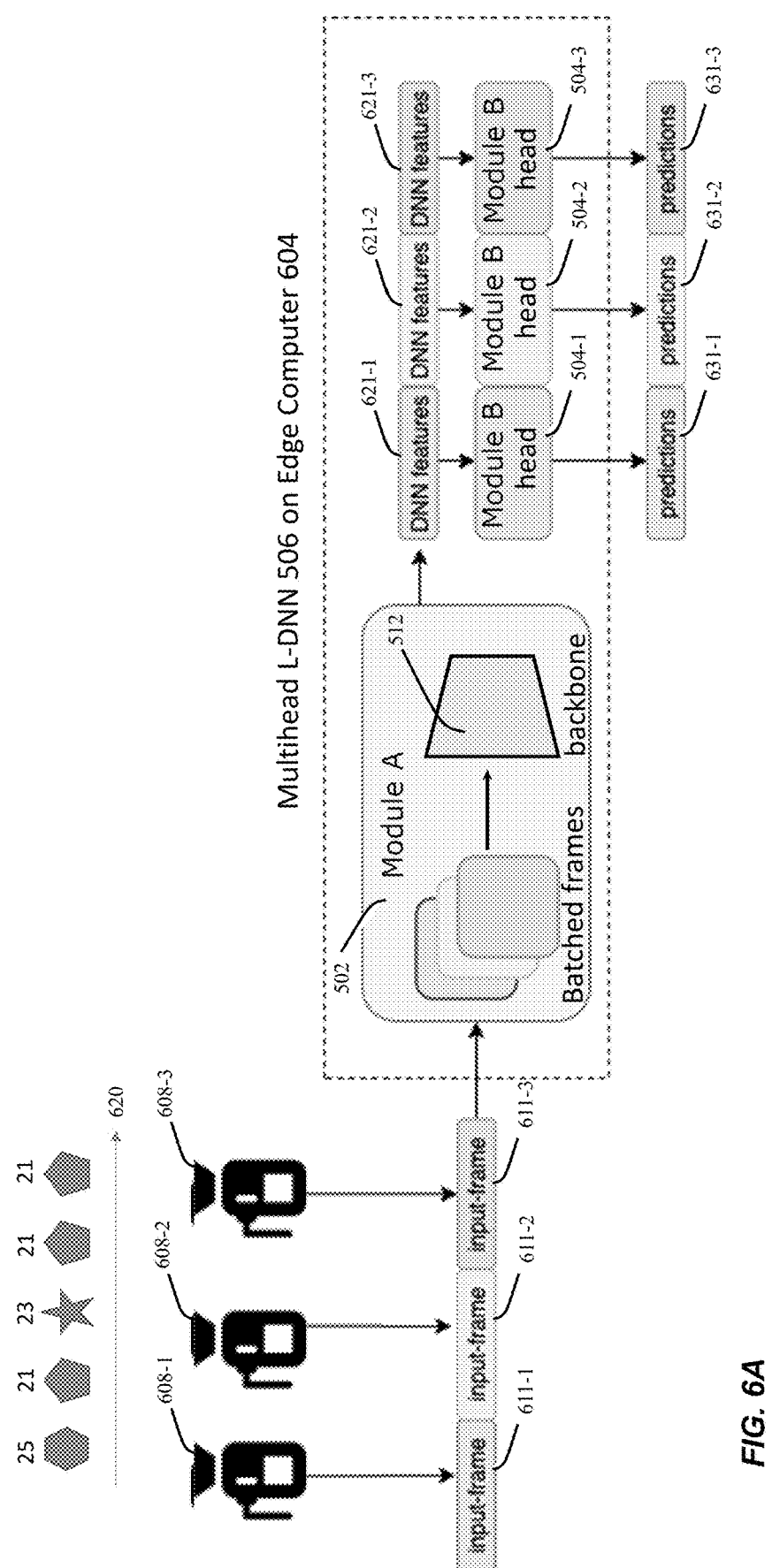
FIG. 6A illustrates a Multihead L-DNN operation within a production line with three image sources and corresponding three separate tasks.

FIG. 6A shows a VIA platform 600 with a Multihead L-DNN 506 running on an edge computer 604 and configured to perform visual inspection of objects 21, 23, and 25 on a production line 620. The system 600 includes multiple input sources (here, cameras 608-1 through 608-3) coupled to the edge computer 604. Each input source (camera 608) produces a corresponding input array (image) 611-1 through 611-3 on every takt of the production line 620. These images 611 are batched together and fed into the DNN backbone 510 of the Multihead L-DNN 506. During the batching process, the edge computer 604 may resize or pad the input arrays so that they are all of the same size. This allows modern DNN frameworks to process the whole batch in parallel, which increases the processing speed of the Multihead L-DNN 506. The backbone 112 outputs a batch of feature vectors 621-1 through 621-3. This batch is split in individual feature vectors, each of which is fed into a corresponding Module B head 504-1 through 504-3. Modules B 504 are computationally lightweight and can be executed in parallel on any system that is powerful enough to execute Module A 502, including the edge computer 604. The heads 504 generate inferences 531-1 through 531-3, or predictions, based on the features 521 about whether the objects 21, 23, and 25 are good or not good (anomalous) for each input (cameras or ROIs) on every takt of the production pipeline.

Suitable types of heads 504 (Modules B) for the Multihead L-DNN 506 include but are not limited to: fast-learning L-DNN classification heads as described in U.S. Pre-Grant Publication No. 2018/0330238 A1, which is incorporated herein by reference; anomaly recognition fast-learning L-DNN heads as described above; backpropagation-based classification heads as in conventional DNNs or in transfer learning based DNNs; and detection or segmentation heads based fully or partially on L-DNN fast learning or conventional backpropagation learning. The heads in a single Multihead L-DNN 506 can be homogeneous (same type) or heterogeneous (different types), so long as they are all trained using the same Module A.

Figure 6C:
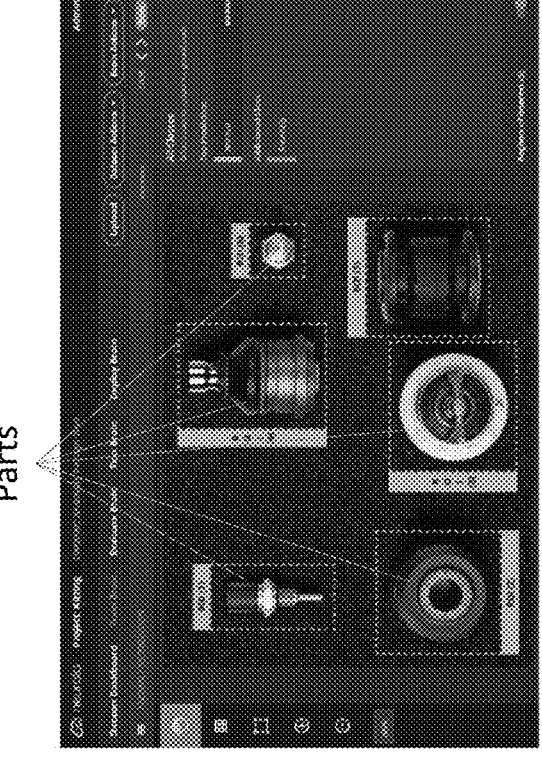
FIG. 6C illustrates a dashboard for a Multihead L-DNN configured to inspect and identify anomalies in different parts packed together in a kit.
Figure 6B:
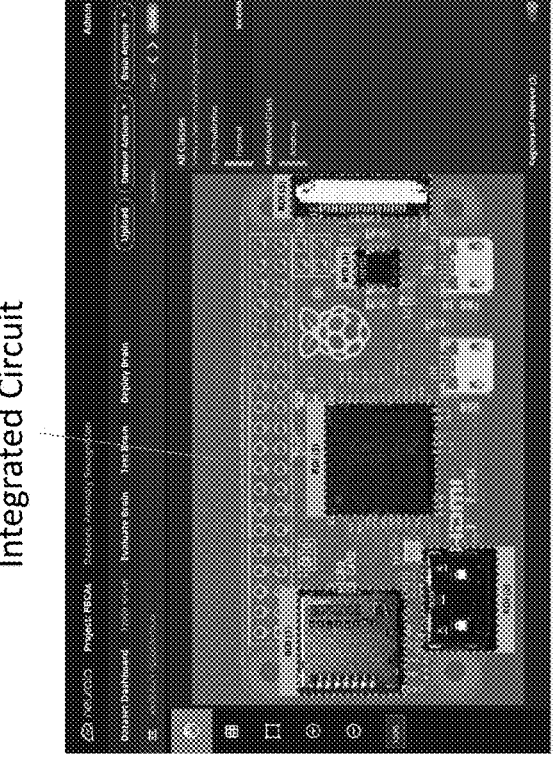
FIG. 6B illustrates a dashboard for a Multihead L-DNN configured to inspect and identify anomalies in different regions of interest (ROIs) of an integrated circuit.

FIGS. 6B and 6C show interfaces for a Multihead L-DNN VIA system inspecting different components. These interfaces can be rendered on the displays of the laptop 201, HMI 212, or another computer or display operably coupled to the edge computer(s) 208. An operator can use these interfaces to monitor performance of the VIA system, to respond to alarms set by the VIA system, and, in supervised learning mode, to label or classify anomalies flagged by the VIA system. This enables the operator to teach the VIA system, on the fly, how to recognize and classify previously unseen anomalies.

In FIG. 6B, the interface shows a picture of a printed circuit board (PCB) with five different ROIs, each of which includes a different component. A single camera images the entire PCB with high resolution. Then each ROI is cut out of the original image, and the five ROIs are resized to the same size and batched together and then fed into the backbone to be processed in parallel. Five different heads evaluate the respective features corresponding to the five ROIs and return inferences of normal or anomalous depending on the image. In FIG. 6C, the interface features pictures of different parts (labeled ROIs (1) through (5)) for a kit. The images of the parts can be collected by a single camera all at once, by five separate cameras operating at the same or different times, or by a group of 1-5 cameras. The backbone extracts features from the five images batched together and sends the corresponding extracted features to five corresponding heads, which are lightweight enough to evaluate the respective ROIs in parallel for faster throughput.

Multihead L-DNN is especially useful for prototypes, custom work, and small volumes situations where the L-DNN can be trained quickly on a small data set. Visual inspection can flag surface defects, poor welds, and bent pins and can replace or complement conventional functional testing. If there are enough defective parts available, or if the heads operate in supervised mode, the L-DNN can even be trained to classify the type of failure or defect, including incomplete or missing solder traces or improperly oriented components.

A Multihead L-DNN-based VIA system could also inspect kits for use in building cars with customized features on automotive assembly lines. This can be done with any complex assembly process, where each assembly may have different parts, and is becoming more common within automotive manufacturing. Kitting allows for customization or can be used when many small parts are used in a single assembly. At the same time, it reduces the complexity on the line and improves efficiency of material handling. Kitting also reduces the chances of the wrong part being picked and used line-side, ensuring that the operator has the materials needed to complete the assembly.

The kitting process is becoming more automated, but the most common practice still has people creating the kits. The form factor of the kits can vary based on the type of parts, but they are usually boxes or racks. The kits are often fixtured, so that each type of part is in the same spot in each kit. There is minimal, if any, inspection being performed. Processes are often created to reduce or minimize errors (such as picking sequences, using picking lights, and computerized systems), but there is often no inspection to ensure the correct parts are in the kit after the kit is created; it is assumed that parts are being chosen correctly by the kitting operator and placed in the appropriate bin. This can lead to incorrect parts being used, or the operator not having the right parts on the assembly line which can affect productivity.

Kits can be inspected by a VIA system running a single-head L-DNN, where each kit has its own anomaly model. The operator tells the system which kit they are pulling parts for by scanning a barcode on the kitting container, and the barcode indicates which kit is being build and what parts are to be expected. When parts are not in the kit, or incorrect parts are placed in the kit, the VIA system detects an anomaly and sends an error message to an HMI via Modbus TCP through a PLC to tell the operator to check their work.

Building on the single-head L-DNN implementation, a Multihead L-DNN VIA system can use multiple ROIs to simplify the model building and to provide more informative quality metrics. Each area of the kitting fixture can be its own region of interest, meaning that each part has its own ROI. This simplifies model building: each head is trained to evaluate a different ROI for each possible part variant. Kits can be made up by selecting the relevant parts in each model, rather than needing to build a model for each kit (reducing the amount of training required). In addition, rather than just indicating that the kit is incorrect, using a multi-ROI inspection, the VIA can identify which part, if any, is incorrect. This leads to higher quality inspection, increases the yield, and reducing rework.

Similarly, Multihead L-DNN can be used to inspect packed cases. There are many different types of case packing, including placing cans in a cardboard box and then shrink wrapping the packed, closed cardboard box. These case packings are often used for pet food, canned vegetables, canned soup, etc. This packaging may be just used for transportation (e.g., to a grocery store, where the cans are unpacked and placed on a shelf) or for sale as a unit to the customer (e.g., in a warehouse, for bulk purchases). Each can be treated as different a different ROI and inspected for dents, etc. Alternatively, the different heads of the Multihead L-DNN can be trained to evaluate different aspects of an image of the packed case, including whether the shrink wrap is torn, the shape of the cans (no bulges or dents), the folded of the packaging, etc., all from the same image or set of images.

Dominance Parameters: False Positive/False Negative Anomaly Detection Thresholds How precisely an L-DNN identifies anomalies depends in part on a dominance parameter that can be adjusted by the user. The L-DNN head (Module B) uses this dominance parameter to determine how well a feature vector extracted by the L-DNN backbone (Module A) matches a particular representation of the known (good) object. It does this by determining how much closer the extracted feature(s) are to this particular representation versus to all other representations. A dominance value of 10 means that to be accepted as an example of the particular class, the features of the input should be 10 times closer to the prototype for this class than to a prototype of any other class. If this condition is not met, the input is recognized as an anomaly. If the dominance parameter is too small, then the L-DNN may report more false positives, i.e., it will report more anomalies as normal objects (top part of TABLE 1). And if the dominance parameter is too large, then the L-DNN may report more false negatives, i.e., it will report more normal objects as anomalous (bottom of TABLE 1). The operator can adjust the false negative/false positive ratio by changing this dominance factor in response to system performance.

The following example illustrates how changing the dominance factor affects L-DNN performance. The L-DNN dominance parameter(s) can be adjusted to bias the system towards eliminating false positives or false negatives depending on the user choice. In a human-assisted quality control system, false negatives (i.e., identifying an anomaly where there is none) are more acceptable since the output goes through human review anyway, while false positives (missed anomalies) are less acceptable. For a fully automatic anomaly detection system without human supervision, the user has a choice of setting the balance.

Here are results of a pilot study inspecting packs of chewing gum where some pieces were removed, crushed, or replaced, for two different values of the classifier dominance parameter d:

TABLE 1

| | | Prediction | | |
| --- | --- | --- | --- | --- |
| | | Normal | Anomaly | % Correct |
| d = 30.0 | Normal | 84 | 1 | 98.82353 |
| | Anomalies | 3 | 75 | 96.15385 |
| d = 40.0 | Normal | 82 | 3 | 96.47059 |
| | Anomalies | 1 | 77 | 98.71795 |

In TABLE 1, the dominance parameter describes how the classifier's prediction should be compared to all other possible predictions for the system to accept the prediction. Generally, a higher dominance parameter causes the system to be very meticulous: all "normal" values are truly normal, but anomalous values may include some normal values. A lower dominance parameter causes the system to be less meticulous: all "anomalous" values are truly anomalous, but normal values may include some anomalous values. Here, the parameter d shifts the balance from false positives (upper part of TABLE 1, three anomalies missed) to false negatives (lower part of TABLE 1, only one anomaly missed, but three normal cases classified as anomalous).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of identifying anomalous objects on an assembly line with a pre-trained backbone and a fast-learning head running on a processor coupled to a sensor, the method comprising:

training the fast-learning head to recognize normal objects on the inspection line without training the fast-learning head to recognize anomalous objects;

acquiring data representing an object on the assembly line with the sensor;

extracting features of the data of the object with the pretrained backbone;

automatically recognizing, with the fast-learning head, that the object is anomalous based on the features of the data extracted by the pretrained backbone; and automatically diverting the object from the assembly line in response to the fast-learning head recognizing that the object is anomalous.

2. The method of claim 1, wherein the sensor is a camera and acquiring the data comprises acquiring an image of the object.

3. The method of claim 2, wherein training the fast-learning head comprises training the fast-learning head on fewer than 100 images of normal objects.

4. The method of claim 1, wherein acquiring the data comprises acquiring time-series data.

5. The method of claim 1, wherein extracting features of the data comprises propagating the data through convolutional layers of a neural network trained to recognize normal objects.

6. The method of claim 1, wherein extracting features of the data comprises at least one of Fourier transforming or wavelet transforming the data.

7. The method of claim 1, further comprising:

identifying, by the fast-learning head, the object as having a previously unseen type of anomaly.

8. The method of claim 7, further comprising:

labeling the previously unseen type of anomaly as a first type of anomaly in response to input from a user.

9. The method of claim 7, wherein the object is a first object, and further comprising:

acquiring data representing a second object on the assembly line;

extracting features of the data representing the second object with the pretrained backbone; and automatically recognizing, with the fast-learning head, that the second object is anomalous based on the features extracted from the data representing the second object.

10. The method of claim 9, further comprising:

classifying, by the fast-learning head, the second object as having the first type of anomaly.

11. The method of claim 9, wherein the previously unseen type of anomaly is a first previously unseen type of anomaly, and further comprising:

identifying the second object as having a second previously unseen type of anomaly; and labeling the second previously unseen type of anomaly as a second type of anomaly in response to input from a user.

12. The method of claim 1, wherein the fast-learning head is a first fast-learning head, the sensor is a first sensor, and further comprising:

training a second fast-learning head to recognize normal objects on the inspection line without training the second fast-learning head to recognize anomalous objects;

acquiring data representing a different view of the object on the assembly line with a second sensor;

extracting features of the data of the different view of the object with the pretrained backbone; and automatically recognizing, with the second fast-learning head, that the object is anomalous based on the features of the data representing the different view of the object extracted by the pretrained backbone.

13. The method of claim 1, wherein the fast-learning head is a first fast-learning head, the sensor is a first sensor, and the object is a first object, and further comprising:

training a second fast-learning head to recognize normal objects on the inspection line without training the second fast-learning head to recognize anomalous objects;

acquiring data representing a second object on the assembly line with a second sensor;

extracting features of the data of the second object with the pretrained backbone; and automatically recognizing, with the second fast-learning head, that the second object is anomalous based on the features of the data extracted by the pretrained backbone.

14. The method of claim 1, wherein the fast-learning head is a first fast-learning head, the data comprises an image, and training the first fast-learning head to recognize normal objects comprises training the first fast-learning head to recognize a normal first region of interest in training images, and further comprising:

training a second fast-learning head to recognize a normal second region of interest of the training images without training the second fast-learning head to recognize anomalous second regions of interest; and automatically recognizing, with the second fast-learning head, that a second region of interest of the image is anomalous based on the features of the data extracted by the pretrained backbone.

15. The method of claim 1, further comprising:

automatically locating, with the fast-learning head, a location of an anomaly in the image of the first object.

16. The method of claim 1, further comprising:

triggering an alert in response to the fast-learning head recognizing that the object is anomalous.

17. A system for inspecting objects on an assembly line, the system comprising:

a sensor configured to acquire data representing an object on the assembly line;

a processor operably coupled to the sensor and configured to execute:

a pretrained backbone to extract features of the object from the data; and a fast-learning head, trained only on data representing normal objects, to receive the features from the pretrained backbone and to identify the object as normal or anomalous based on the features; and a programmable logic controller, operably coupled to the processor, to divert the object from the assembly line in response to the fast-learning head recognizing that the object is anomalous.

18. The system of claim 17, wherein the sensor is a camera and the data comprises an image of the object.

19. The system of claim 18, wherein the fast-learning head is trained on fewer than 100 images of normal objects.

20. The system of claim 17, wherein the sensor is configured to acquire time-series data representing the object.

21. The system of claim 17, wherein the pretrained backbone comprises convolutional layers of a neural network trained to recognize normal objects.

22. The system of claim 17, wherein the pretrained backbone is configured to extract the features by at least one of Fourier transforming or wavelet transforming the data.

23. The system of claim 17, wherein the fast-learning head is configured to identify the object as having a previously unseen type of anomaly.

24. The system of claim 23, further comprising:

an interface, operably coupled to the processor, to enable the user to label the previously unseen type of anomaly as a first type of anomaly.

25. The system of claim 23, wherein the object is a first object, and the sensor is configured to acquire data representing a second object on the assembly line, the pretrained backbone is configured to extract features of the data representing the second object, and the fast-learning head is configured to automatically recognize that the second object is anomalous based on the features extracted from the data representing the second object.

26. The system of claim 25, wherein the fast-learning head is configured to classify the second object as having a first type of anomaly.

27. The system of claim 25, wherein the previously unseen type of anomaly is a first type of anomaly, the fast-learning head identifies the second object as having a second previously unseen type of anomaly, and further comprising:

an interface, operably coupled to the processor, to enable the user to label the second previously unseen type of anomaly as a second type of anomaly.

28. The system of claim 17, wherein the at least one fast-learning head is a first fast-learning head, the sensor is a first sensor, and further comprising:

a second sensor, operably coupled to the processor, to acquire data representing a different view of the object on the assembly line, and wherein the processor is configured to execute a second fast-learning head, trained only on data representing normal objects, to recognize that the object is anomalous based on the features of the data representing the different view of the object extracted by the pretrained backbone.

29. The system of claim 17, wherein the object is a first object, the fast-learning head is a first fast-learning head, the sensor is a first sensor, and the object is a first object, and further comprising:

a second sensor, operably coupled to the processor, to acquire data of second object on the assembly line, and wherein the processor is configured to execute a second fast-learning head, trained only on data representing normal objects, to recognize that the second object is anomalous based on the features of the data of the second extracted by the pretrained backbone.

30. The system of claim 17, wherein the sensor is a camera, the data is an image, the fast-learning head is a first fast-learning head trained to recognize only a first region of interest in normal training images, and the processor is configured to execute a second fast-learning head, trained to recognize only a second region of interest in the normal training images, to recognize that a second region of interest of the image is anomalous based on the features of the data extracted by the pretrained backbone.

31. The system of claim 17, wherein the fast-learning head is configured to locate a location of an anomaly in an image of the object.

32. The system of claim 17, wherein the processor is configured to trigger an alert in response to the fast-learning head recognizing that the object is anomalous.

* * * * *